No. 607,642. Patented July 19, 1898.
A. M. BOTELHO.
PORTABLE FURNACE OR STOVE.
(Application filed Aug. 17, 1897.)
(No Model.)
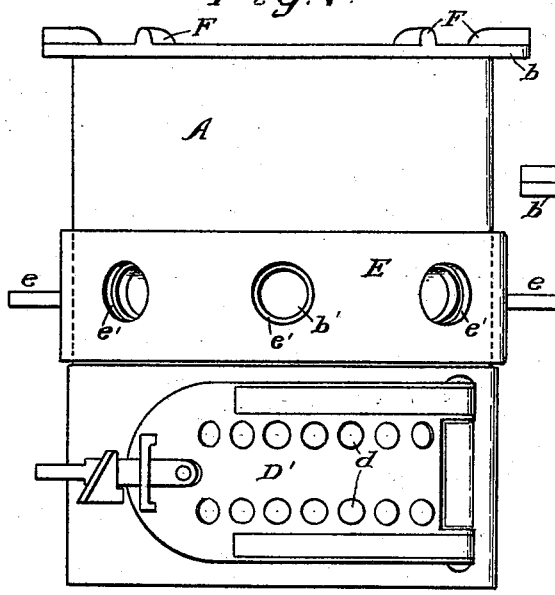
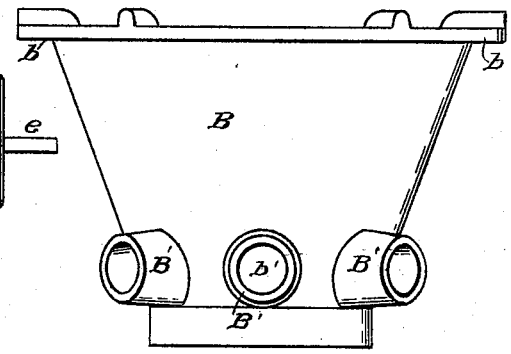
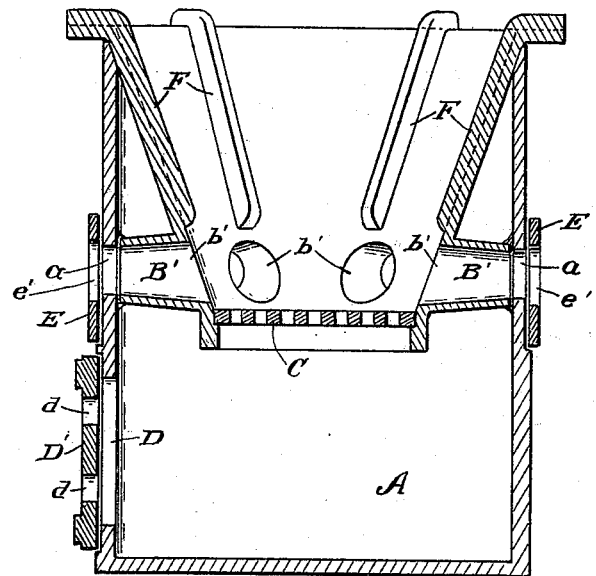
WITNESSES:
INVENTOR
Antonio Mendes Botelho
BY
ATTORNEYS.

UNITED STATES PATENT OFFICE.

ANTONIO MENDES BOTELHO, OF CINTRA, PORTUGAL.

PORTABLE FURNACE OR STOVE.

SPECIFICATION forming part of Letters Patent No. 607,642, dated July 19, 1898.

Application filed August 17, 1897. Serial No. 648,513. (No model.)

*To all whom it may concern:*

Be it known that I, ANTONIO MENDES BOTELHO, a subject of the King of Portugal, residing at Cintra, Portugal, have invented certain new and useful Improvements in Portable Furnaces or Stoves, of which the following is a specification.

This invention relates to improvements in portable furnaces, ranges, or stoves; and the object thereof is to provide for the utilization of cheap and easily-attainable fuels, especially coke coal.

The invention is fully disclosed in the following specification, of which the accompanying drawings form a part, in which—

Figure 1 is a view of a complete portable furnace, range, or stove. Fig. 2 is a view of the fire-pot removed from the casing. Fig. 3 is a vertical section of the furnace.

In the drawings the separate parts of my improvements are designated by the same letters of reference in each of the views.

A is a casing of any suitable form and material and of sufficient capacity for receiving a fire-pot and still leaving below ample space for an ash-hole, which may be utilized for baking bread or any other similar purpose.

B is the fire-pot, where the fuel is burned adapted to be maintained by a flange $b$ within the upper part of the casing.

C is a grate supported by a flange in the hearth at the bottom of the latter and designed both to bear the fuel and to allow the passage of the ashes.

D is the ash-hole at the lower part of the casing, provided with a hinged door D' and with a series of holes $d$ for allowing the moisture of the bread or article which is being baked or cooked therein to escape and for facilitating the current that must circulate through the ash-hole and grate.

In the central portion of the side wall of the casing A there are formed a number of holes $a$—say six—for the admission of air, which may be open or closed, wholly or in part, by means of a regulating iron hoop E, moving horizontally on the outside of the casing and provided with handles $e$ and a number of holes $e'$, that, under the action of said handles $e$, are made to register or not with the holes $a$ in the vessel, box, or case, as it is desired to light or extinguish the fire or to increase or reduce the intensity of the combustion.

At the point of the fire-pot B (which is funnel-shaped) where the grate C is set I provide said fire-pot with a number of holes $b'$, which register with the holes in the casing and are connected with them through air-supplying tubes B', fixed or secured to the fire-pot B, and the joints of which are cemented or otherwise made air-tight. On the spaces between each two holes $b'$ and against the inner walls of the fire-pot I fasten an equal number of ribs F, projecting beyond the upper edge of the hearth and which take the place of the usual triangle, on which the kitchen implements are set. These ribs form channels around the inside of the fire-pot that assists to the free passage of the air.

It is obvious that when the apparatus is to be used in practice the iron hoop E must be moved horizontally by its handles $e$, so as to cause the holes $a$ to correspond wholly or partially with the tubes B' in the fire-pot, and that in such position the object of my improvements is accomplished in a most simple, efficient, and satisfactory manner.

It will be seen that by bringing in the air from all sides through the holes in the casing and the tubular projections from the fire-pot I cause the air to be warmed by its passage through these parts before it reaches the fire, thereby insuring pure, perfect combustion, and, moreover, the draft coming in at these points is not interfered with by the ashes.

I claim—

In a portable furnace, the combination with the outer casing having holes in its side wall and an adjustable regulating-ring surrounding said casing, and having holes capable of registering with the holes in the casing, of a funnel-shaped fire-pot resting at its top on the top of the casing and having separate tubular projections extending from its lower part to connect with the openings in the casing.

ANTONIO MENDES BOTELHO.

Witnesses:
ANTONIO CARNER DE CARRNELY,
J. P. FROMEUX.